Figure 1:
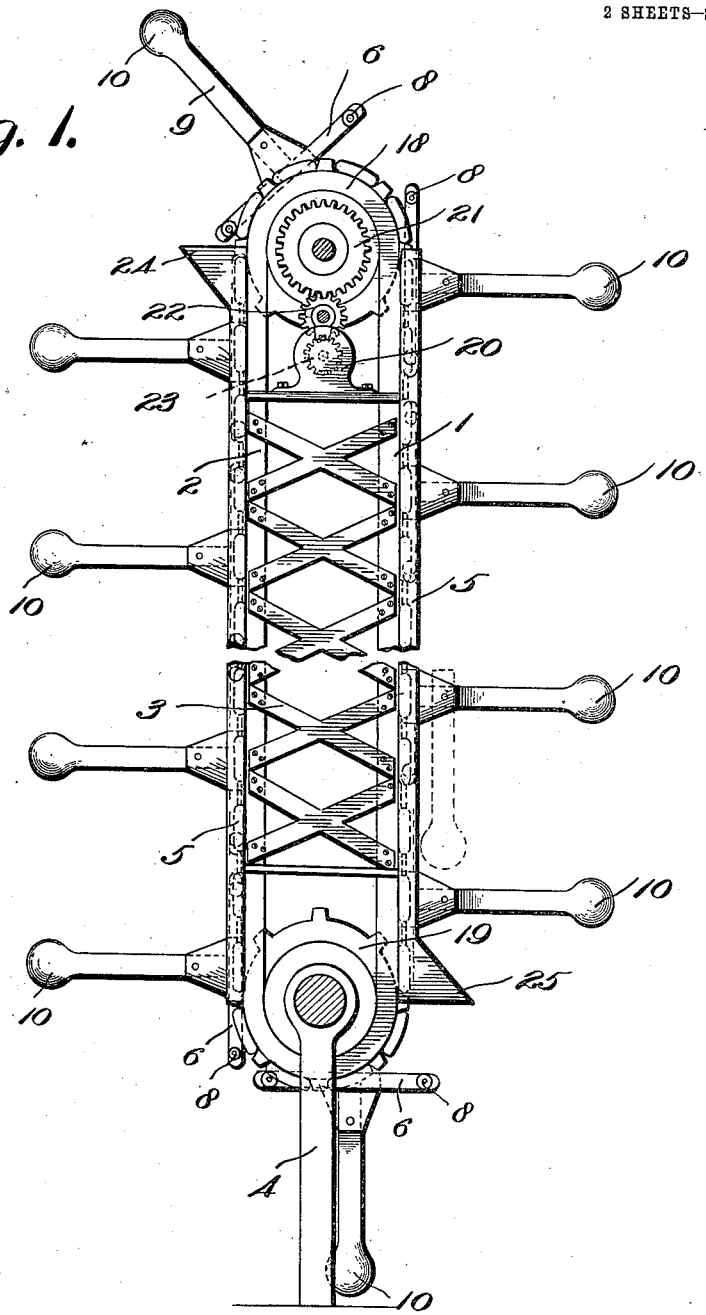

M. J. GIBBONS.
CONVEYER.
APPLICATION FILED FEB. 24, 1913.

1,083,083.

Patented Dec. 30, 1913.

2 SHEETS—SHEET 1.

Witnesses
H. W. Primm
H. H. Pyne

Inventor
Michael J. Gibbons,
by Wilkinson, Witherspoon
& MacKay
Attorneys

M. J. GIBBONS.
CONVEYER.
APPLICATION FILED FEB. 24, 1913.
1,083,083.
Patented Dec. 30, 1913.
2 SHEETS—SHEET 2.
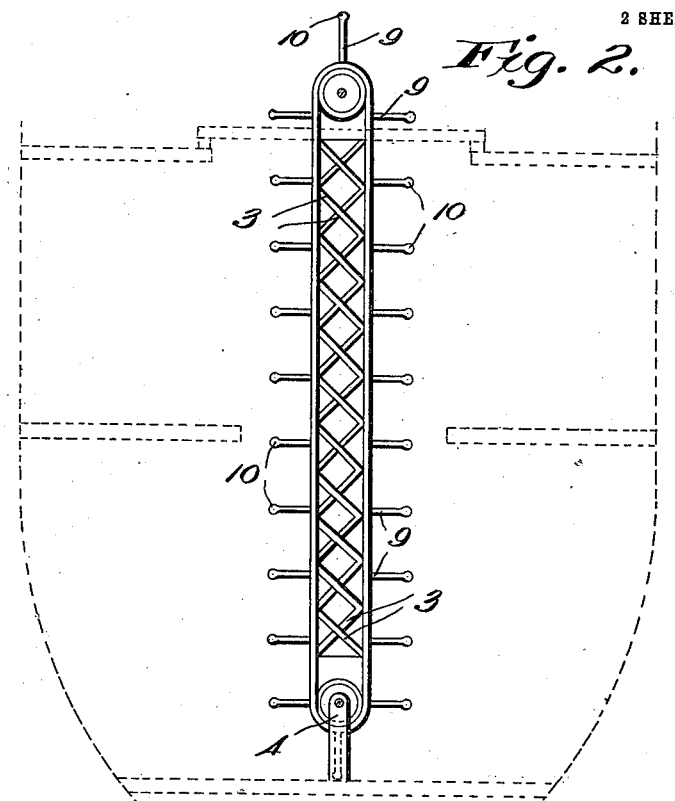
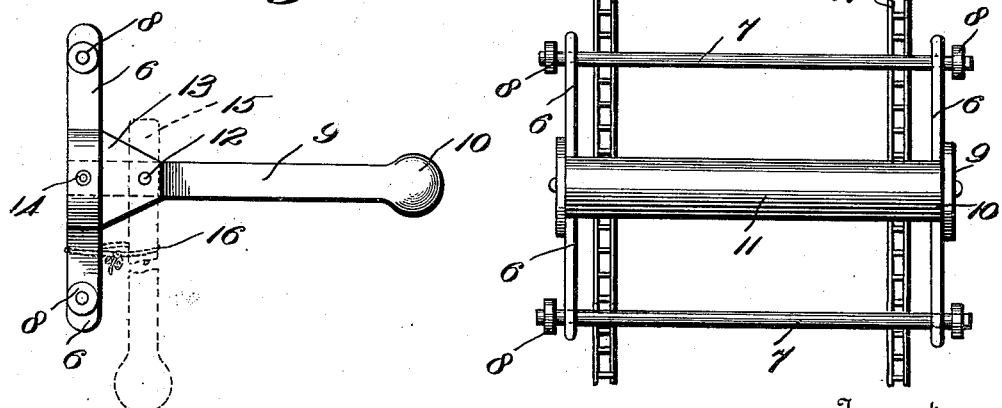

UNITED STATES PATENT OFFICE.

MICHAEL J. GIBBONS, OF NEW ORLEANS, LOUISIANA.

CONVEYER.

1,083,083.  Specification of Letters Patent.  Patented Dec. 30, 1913.

Application filed February 24, 1913. Serial No. 750,311.

*To all whom it may concern:*

Be it known that I, MICHAEL J. GIBBONS, a citizen of the United States, residing at New Orleans, in the parish of Orleans and State of Louisiana, have invented certain new and useful Improvements in Conveyers; and I do hereby declare the following to be a full, clear, and exact description of the invention, such as will enable others skilled in the art to which it appertains to make and use the same.

My present invention relates to endless conveyers of the elevating and lowering type, and has for its purpose to provide an apparatus of that character wherein either the elevating or lowering of the material may be done singly, or both operations carried out together.

The invention has for its further purpose to provide an endless conveyer and operating motor therefor which is self-contained, to the end that the apparatus in its entirety may be readily transported from place to place and be ready for immediate use.

The invention further proposes an endless and portable conveyer employing a collapsible or foldable type of carrier, to the end of facility in handling, and economy in space for storage; and for adapting the conveyer to different uses.

With these and other objects in view the invention consists in the novel details of construction and combinations of parts more fully hereinafter disclosed and particularly pointed out in the claim.

Referring to the accompanying drawings forming a part of this specification in which like numerals designate like parts in all the views:—Figure 1 is a side elevational view of the apparatus complete; Fig. 2 illustrates the application of the conveyer to a vessel; Fig. 3 is a side elevational view of one of the conveyer units; and Fig. 4 is a front elevational view of the same and showing the conveyer chain.

Referring to the construction in detail, the conveyer consists of a suitable frame comprising parallel side sections 1 and 2, reinforced by cross pieces 3, and a support, or foot, 4 adapted to support the frame on any suitable base. Said side sections 1 and 2 are each constructed with a channelway 5 providing guides for the several conveyer units, as will be further explained.

The conveyer units (see Figs. 3 and 4) consist each of a carriage constructed of side members 6 and cross bars 7, which bars at their respective ends have journaled thereon anti-friction rollers 8 adapted to travel within the guideways, or tracks, 5. A carrier is mounted on each carriage and consists of a pair of parallel arms 9 which are enlarged at their outer ends 10, and a cross bar 11 connects said ends, as shown. The side arms 9 are pivotally mounted at 12 to lugs 13 that are secured to the side members 6 of the carriage frame.

The carriers are adapted to be held in rigid position on the carriages through the medium of a bolt, or pin, 14 which engages with the ends 15 of said carrier arms and secures the same to the side members 6 of the carriage. Thus for elevating or lowering material in bulk, the carriers will be supported rigidly with respect to the carriages, as in the manner shown, and for certain purposes it may be desirable to use the carriers in their closed or folded position, as indicated by broken lines in Figs. 1 and 3. In this instance, the securing pin, or bolt, 14 of each carrier would be removed and the carrier secured in its closed position through the medium of the tie 16, or other suitable device. In this latter instance, also, the several carriers would be so secured for collapsing the conveyer for purposes of transportation, or storage, as will be understood.

The several carriages are suitably connected to a pair of endless conveyer chains, or link belts, 17 which travel over sprockets 18 and 19 located respectively at the upper and lower ends of the conveyer supporting frame. The chains are operated through the medium of a suitable motor 20 mounted on the frame, and which is geared to drive the upper sprockets 18 through meshing pinions 21, 22 and 23.

In operation the several upwardly moving carriages are held rigid, or against tilting, through the medium of their respective rollers engaging in the guideways, and when said carriage has reached the top of the frame it assumes substantially that position shown in Fig. 1, and on its downward or returning movement, the advancing end of the carriage is caused to be guided to properly engage with the guideways through the medium of guides 24, of which there is one provided for each channelway. In like manner, the lower ends of the opposite tracks 5 are provided with guides 25 for a similar purpose.

From the foregoing, it will therefore be seen that the apparatus is capable of operating on one side as an elevator, on the opposite side as a lowering conveyer, and that both the elevator and lowering conveyer may be operated simultaneously. It will be further seen that by reason of the enlarged, or rounded, ends of the carriers that the same are fitted for conveying such articles as would otherwise be broken were these parts of the conveyer carriers constructed with sharp, or pointed, portions; thus, for instance, the same is well adapted for use in carrying bags, or the like.

It is obvious that those skilled in the art may vary the details of construction and arrangement of parts without departing from the spirit of my invention, and therefore I do not wish to be limited to such features except as may be required by the claim.

I claim:—

In an endless elevating and lowering apparatus, the combination of a frame providing opposed parallel guideways; a conveyer comprising a plurality of units, each of said units consisting of a rectangular frame having antifriction rollers at its respective corners adapted to move within said guideways; a frame comprising side arms and a cross bar pivotally mounted on the rectangular frame; means for securing the pivoted frame in different positions on the rectangular frame; sprocket wheels journaled at the respective ends of the first-named frame; and endless chains mounted to operate on said sprockets and having flexible connections with said conveyer units.

In testimony whereof I affix my signature in the presence of two witnesses.

MICHAEL J. GIBBONS.

Witnesses:
 ED A. RUCKER, Jr.,
 J. P. MCELROY.

---

Copies of this patent may be obtained for five cents each, by addressing the "Commissioner of Patents, Washington, D. C."